United States Patent Office 3,483,362
Patented Dec. 9, 1969

3,483,362
HYBRID MACHINE CONTROL SYSTEM
Hans-Helmut Feldmann, Neu Isenburg, and Erwin Sanetra, Offenbach am Main-Heusenstamm, Germany, assignors to Licentia Patent-Verwaltungs G.m.b.H., Frankfurt am Main, Germany
Filed Jan. 6, 1967, Ser. No. 607,750
Claims priority, application Germany, Jan. 7, 1966, L 52,535; Apr. 29, 1966, L 53,460, L 53,461
Int. Cl. G06j 1/00; G06f 15/46
U.S. Cl. 235—150.5                    17 Claims

ABSTRACT OF THE DISCLOSURE

A hybrid (analog/digital) machine control system for simultaneously moving two movable machine elements in accordance with programmed digital instructions. The control system includes two digital to analog converters with a regulator means connected between the inputs and outputs of the two converters to maintain the proper ratio of output signals when either of the two converters becomes saturated. Function generator means is connected between the inputs and outputs of the two digital to analog converters to maintain a constant predetermined mathematical relaionship between the output signals thereof without altering the ratio thereinbetween. The two movable machine elements correspond respectively to the X and Y coordinates of a single movable machine element, and the digital signals indicate a desired position for the single movable machine element. The mathematical relationship between the outputs of the two digital to analog converters is maintained constant to provide a constant velocity for the single movable machine element as it is moved from one set of X, Y coordinates to another set of X, Y coordinates in accordance with the programmed digital signals.

Background of the invention

In hybrid (analog/digital) machine control systems, e.g. position regulators, the deviation signals which are present in digital form must be converted into analog form in digital to analog converters (D-A converters) before they can be applied to the final control elements. Generally, the converted analog deviation signals comprise the nominal values for analog feedback control systems, e.g. for analog velocity feedback control systems.

Position regulations which are based on this principle may operate basically as simple path controls if the movable element of a working machine, e.g. a machine tool, is simultaneously moved in several coordinates. In that case, the velocities of motion in the individual coordinates are proportional to the deviations, for example by way of the velocities of the driving motors, so that the nominal position values which are fed in by the programmed digital signals are executed over the shortest possible path. While it is possible that deviations from the mathematically predetermined path may arise due to inaccuracies in the signal level and due to varying characteristics of the regulating units, the nominal position itself is reached without error. However, in order to assure that a proportional coordination of the coordinate velocity is still present, the deviation signals in the individual coordinates must not exceed the number of digits of the D-A converters, i.e., the saturation region of the converter characteristics must not be reached.

Moreover, the velocity of movement along the coordinates is not constant, since the velocity is, in fact, proportional to the respective position deviation and will, therefore, decrease, after a new position value has been programmed, going from a maximum down to zero along the path of movement. This results in a constant fluctuation of the path velocity which becomes more marked with large programmed changes of position. The principal object of this invention is to provide an improved hybrid machine control system in which the above-noted drawbacks are eliminated.

Summary of the invention

For the purpose of eliminating the above-noted disadvantages of the prior art system this invention provides a first regulator means coupled between the input and output of the digital to analog converter for varying a common input circuit parameter thereof whenever the output signal of either digital to analog converter exceeds a predetermined threshold value, thus maintaining the correct ratio between the output signals of both digital to analog converters when either of them becomes saturated. The invention further provides second regulator means coupled between the inputs and outputs of both analog to digital converts for varying the same input circuit parameter of both digital to analog converters to maintain a constant mathematical relationship between the output signals thereof without altering the ratio between the two signals, thereby maintaining a constant velocity of motion.

More particularly, this invention provides a hybrid machine control system in which a first common parameter which is variable due to the digital deviations is applied to all digital analog converters to produce analog output signals until a second parameter which is variable as a result of decreasing deviations has attained a predetermined value, whereupon the second parameter is so influenced—until the nominal position values have been attained or until new nominal values are programmed in—that the first parameter decreases as a result of a further decrease of the deviations.

The system of this invention operates preferably in such a manner that the parameter applied to both D-A converters after the programming of a new nominal value is initially maintained constant until the second parameter has attained a specific value; thereafter, the second parameter is maintained constant whereupon the first parameter will decrease. If the D-A converters consist, for example, of parallel-connected D-A resistances which correspond in each case to one digit of the binary deviation, and which are connected or disconnected in accordance with the corresponding digit values (L, O), the analog output signals are produced by currents flowing through the parallel connections. In this case, the first parameter which is applied to both D-A converters is a constant current which is distributed to the D-A converters in dependence upon the respectively connected D-A resistances. The current supplying the D-A converters is maintained constant until the conductances of the resistance combinations have become so small that a specific voltage has been attained at the D-A converters. When this is the case, this voltage is maintained constant so that the currents will decrease with slowly decreasing conductances.

If the D-A resistances of the D-A converters are switched by means of transistors, currents are required for controlling the transistors, and these currents can reach considerable values in several decades and coordinates, which can markedly reduce the operating current available at the power supply. Furthermore, there exist combinations of binary coded decimal numbers wherein, during the transition from one number to the other, a larger number of D-A resistances is simultaneously connected. As a result, the control currents of the corresponding transistors change abruptly so that an unstable operation may be prodcced due to the current fluctuations. This is particularly true if the outputs of the D-A converter are applied to amplifiers having high input resistances, in which case the output currents of the D-A converters are small to begin with.

Furthermore, in the control system of this invention, the path velocity, i.e., the resultant from the velocities of the individual coordinates, is a function of the angle under which the movable machine element is moved. The effect of this dependence may be eliminated by controlling the constant current supplied to the D-A converters by means of commands applied to a program carried, such as a punched tape, in dependence upon the angle of inclination of the path and in such a manner that the path velocity remains constant.

Description of the preferred embodiments

Before discussing the above-noted embodiments in detail, the general principles of the invention will first be discussed. The present invention is directed to a regulator device which maintains the analog output signal of at least one D-A converter constant at a maximum value by controlling an input parameter applied to all of the D-A converters.

If the D-A converters consist of parallel-connected D-A resistances having graduated conductances, the analog values transmitted by the D-A converters are present initially in the form of currents which flow through the D-A resistances. These currents may be converted into voltages by means of amplifiers with large negative feedback, which are known as operational amplifiers in the analog computing art.

If the maximum value of the D-A converter output is determined by the value of a threshold member, for example a Zener diode, which is connected to the output signals of the D-A converters by way of an OR element, the output values of the D-A converters will be maintained constant independently of varying control currents of the transistors which switch the D-A resistances, but the resulting path velocity, which is vectorially formed by the velocity values of the individual coordinates, is dependent upon the ratio of the deviations. If an approximately constant path velocity is desired, the nominal value of the regulating device must be controlled in dependence upon the ratio of the digital deviations. According to a further aspect of the present invention, there is provided a function generator means which is controlled by the output signals of the D-A converters and whose output signal varies in dependence upon the ratio of the digital deviations. Function generator means may consist, for example, of a network of parallel-connected graduated resistance groups each connected in series with a threshold member, for example a source of voltage or a Zener diode. Each resistance of one resistance group is connected through a diode to a voltage which is proportional to the output signal of a corresponding D-A converter.

Another less expensive embodiment of the function generator means comprises a computing circuit whose output signal serves as the nominal value of the first regulating device. This output signal is taken from a summation point which receives a parameter corresponding to the desired path velocity, a parameter corresponding to the largest value of the positive and negative difference of the D-A converter output signals multiplied by $$1 - \frac{1}{\sqrt{2}}$$

A parameter which is proportional to the desired path velocity may be very simply derived from a D-A converter comprising a group of parallel-connected graduated resistances which are connected and disconnected in accordance with the corresponding digit values of a binary signal. The positive and negative difference of the D-A converter output signals are derived from a positive output signal of one D-A converter and a negative output signal of the other D-A converter connected by way of a corresponding resistance and diode with a summation point which preferably comprises the input of a summation amplifier. The resistances through which the output signals are applied to the summation point have a relationship to a negative feedback resistance of the summation amplifier such that the largest difference is multiplied by the value $$1 - \frac{1}{\sqrt{2}}$$

The velocity can be programmed by means of one further D-A converter per coordinate, with the further D-A converter being supplied by a voltage which is proportional to the output signal of the D-A converter controlled by the digital deviation. The velocity is adjusted by controlling the resistances of the additional D-A converters by means of a digital signal which may be applied, for example, to a program carrier, such as a punched tape.

If the digital deviation is present in binary coded decimal form, the increasing decade number involves the difficulty that for higher decades the D-A resistances must assume values which are reduced by powers of ten. This is undesirable, however, because in the low resistance decades the resistances of the transistors switching the D-A resistances cause errors in the analog values. In accordance with a further aspect of this invention, these difficulties are obviated by increasing the supply voltage of the highest-value decade of the D-A converters with decreasing deviation from one tenth of a highest value to the highest value itself. In this case, it is possible to proportion the D-A resistances of these decades with a tenfold higher resistance and to connect them to a tenfold higher supply voltage so that the output current value remains the same while the error is reduced to one tenth by means of the transistors.

In order to prevent the voltage which is applied to the D-A converters by the regulator means and the function generator means of this invention from becoming so small that it will fall within the range of the residual voltages at the switching transistors of the D-A converters, a further aspect of the present invention provides that the negative feedback amplifier connected to the output side of one D-A converter is additionally connected with one further D-A converter controlled in the same manner. The additional D-A converters are positioned at a common low voltage.

The hybrid machine control system of this invention is particularly suitable for digital position regulations wherein one movable machine part is simultaneously moved in at least two coordinates. It may be employed, however, generally in all instances where velocities, e.g., the rates of revolutions of driving motors, are maintained at a specific ratio and are reduced to zero, after programmed paths, for example, after a specific number of revolutions, while maintaining the desired ratio. Such applications exist in digitally controlled mixing machines in which digitally programmed nominal values corresponding to the constituents of a substance to be mixed are compared with the actual values generated by actual value transmitters for example, rotating flowmeters. After conversion into analog values, the deviation signals act upon motors whose rates of revolutions are maintained at a constant ratio. When the second parameter of the D-A converters has attained a specific limiting value, a new nominal value is applied if the mixing process is to be continued, but if it is instead that the mixing process be terminated after attaining the nominal values which correspond to desired quantities, the second parameter is so influenced that the parameter supplying the D-A converters will equally decrease with decreasing deviations until they finally become zero. The programming of new nominal values for purposes of extending the mixing process may be carried out, for example, with an endless punched tape. The digital deviations may be determined very simply by setting the screening discs of an angular coder to the desired value and resetting the angular coder to zero with a quantity meter or flowmeter. In this case, the position of the code discs represents the deviation. If, for the mixing regulation of fluids, pumps are used whose delivery is constant per revolution of the driving motor, such as, for example, gear pumps or impeller pumps, the angular coders may also be coupled with the driving motors.

Apart from position and mixing regulations, the ratio regulation of the present invention may be used also for controlling other variables which are to be maintained at a constant ratio with respect to each other, for example for controlling the rates of revolutions of multimotor drives.

Figure 1:
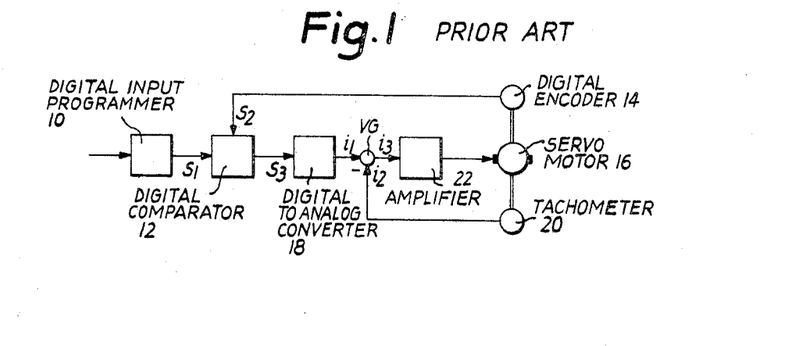
FIGURE 1 is a block diagram of a prior art hybrid machine control system.

Several specific embodiments of the invention will now be described in connection with the attached drawings, in which FIGURE 1 illustrates a prior art control system.

In the schematic illustration of FIGURE 1, the digital nominal value $s_1$ originating from a programming device 10, for example a punched tape, is applied to a digital comparator 12 while the actual value $s_2$ is applied thereto by a digital encoder 14 coupled to servomotor 16. Digital encoder 14 may, for example, be an absolute digital measuring instrument, such as an angular coder. Such angular coders are known per se and have been described, for example, in chapter 3.2 of the book "Die numerische Steuerung von Werkzeugmaschinen" (The Numerical Control of Machine Tools) by W. Simon, Carl Hanser Publisher, Munich, 1963.

The difference between the nominal position value and the actual position value is determined in digital comparator 12, i.e., the position deviation $s_3$ is present in digital form and must be converted into analog form. This is done in a digital-analog converter (D-A converter) 18 whose output signal $i_1$ serves as the nominal value of an analog speed feedback control system and is supplied to a comparative point VG. The construction and operation of the D-A converter will be described in the following figures. Connected opposite the signal $i_1$ at the comparative point VG is the actual value $i_2$ of a speed feedback control system which is provided, for example, by a tachometer 20 coupled to servomotor 16. Servomotor 16 can be a D.C. motor and tachometer 20 a D.C. generator. The difference $i_3$ between the parameters $i_1$ and $i_2$, which corresponds to a deviation in the revolution rate of motor 16, is applied to an amplifier 22 which drives servomotor 16. The digital comparator 12 consists, in the simplest case, of a subtraction circuit of the type described in the chapter entitled "Binary Addition and Subtraction" in the book "Arithmetic Operations in Digital Computers" by R. N. Richards, D. Van Nostrand Company, Inc., 1963.

The feedback control system described hereinabove must be provided for each coordinate. The digital comparator 12, on the other hand, can be used for both feedback control systems if it is time-shared by the nominal position values and the actual position values of the individual coordinates, and if the output signals thereof corresponding to the position deviations are stored during one cycle.

With the above-described prior art control system, it is possible to produce paths under any desired angles if the velocities in the individual coordinates are proportional to the position deviations. However, the velocities in this case are progressively reduced with decreasing position deviations and finally tend to become zero. Such path controls are therefore of little utility in actual practice.

Figure 2:
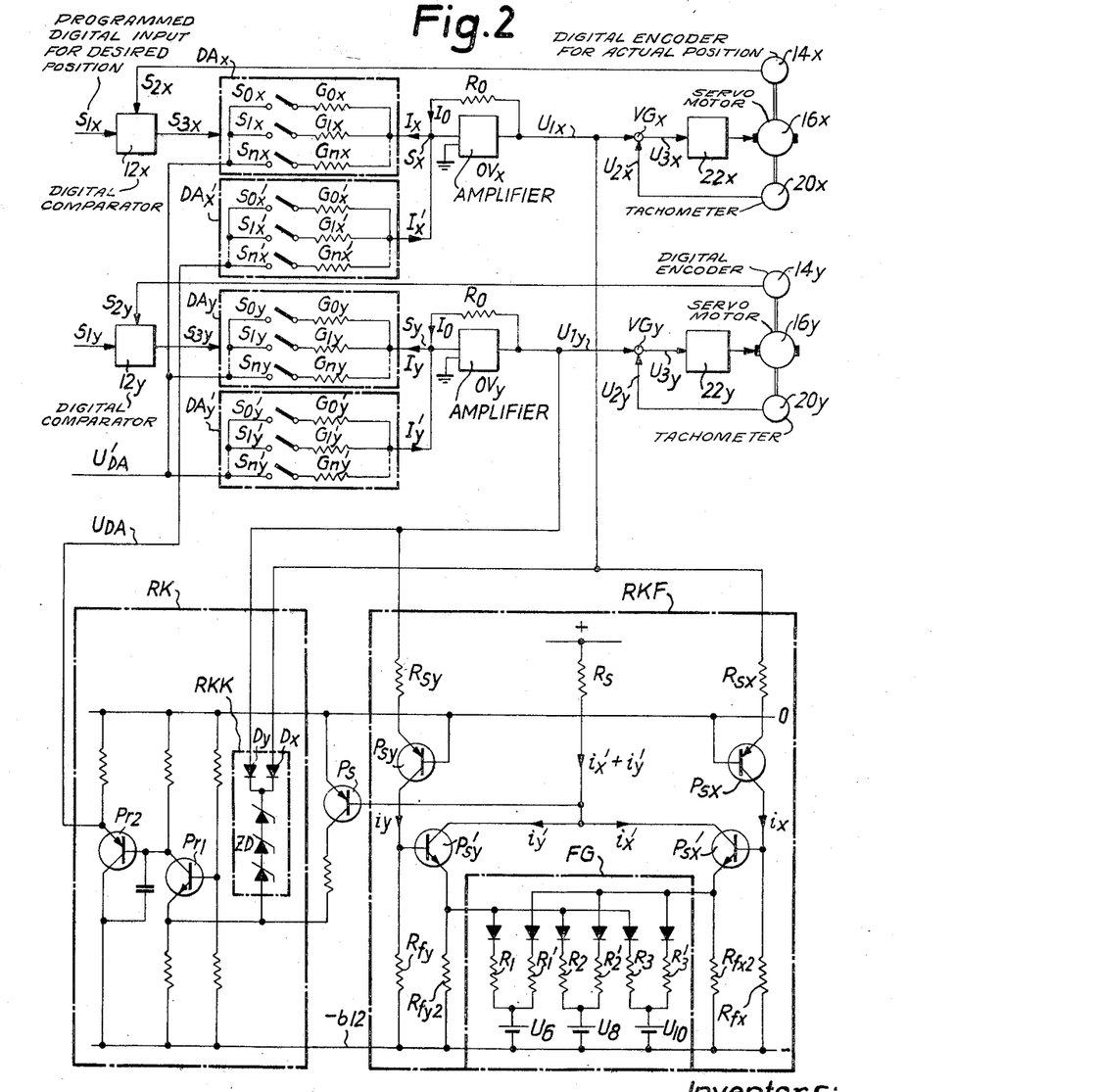
FIGURE 2 is a schematic circuit diagram of one illustrative embodiment of this invention.

FIGURE 2 illustrates an embodiment of the invention which is an improvement in the above-noted prior art control system. This embodiment includes an X coordinate comparator $12_x$ and a Y coordinate comparator $12_y$. The output of the comparators is connected to resistors $G_{ox} \ldots G_{nx}$, $G_{oy} \ldots G_{ny}$ which have graduated conductances and series switches $S_{ox} \ldots S_{nx}$ and $S_{oy} \ldots S_{ny}$, respectively. These resistors and switches constitute digital to analog converters $DA_x$ and $DA_y$ respectively, which are indicated by dashed line boxes in the drawing.

The position deviations for the X and Y coordinates are determined in the comparators $12_x$ and $12_y$ which receive the nominal position values $S_{1x}$, $S_{1y}$ and the actual position values $S_{2x}$, $S_{2y}$. The nominal position values originate from a program storage device (not shown), for example a punched tape, whereas the actual position values are generated by angular coders $14_x$ and $14_y$, which, together with the tachometers $20_x$ and $20_y$ operating as actual velocity value transmitters, are coupled to servomotors $16_x$ and $16_y$. The resistances of the D-A converters $DA_x$ and $DA_y$ correspond in each case to a digit of the position deviation in such a manner that they are connected or disconnected depending on the binary state of the corresponding digit. The output currents $J_x$, $J_y$ are proportional to the values of the binary signals of the individual coordinates as determined by combinations of the switches, and these currents comprise analog output signals of the D-A converters. Currents $J_x$ and $J_y$ are applied by way of resistances $R_o$ to amplifiers $OV_x$, $OV_y$ which have negative feedback and high input impedance. The amplifiers convert the currents into voltages $U_{1x}$, $U_{1y}$. The outputs of these amplifiers constitute the nominal values of the corresponding speed feedback control systems.

Connected opposite the nominal velocity values at the comparative points $VG_x$, $VG_y$, are the actual velocity values $U_{2x}$, $U_{2y}$ which are generated by tachometers $20_x$ and $20_y$. The velocity deviations $U_{3x}$, $U_{3y}$ are applied to servoamplifiers $22_x$ and $22_y$, which control servomotors $16_x$ and $16_y$.

The output values $U_{1x}$, $U_{1y}$ of the operating amplifiers are connected by way of diodes $D_x$, $D_y$ which act as OR members in combination with series-connected Zener diodes ZD, to a joint potential $-b12$ which is negative as compared to the output potentials and to the zero potential. By way of the two transisors $P_{r1}$ and $P_{r2}$, a supply voltage $U_{DA}$ is applied to the D-A converters which is equal to the voltage $-b12$ until the Zener diodes ZD become conductive.

When new nominal position values are programmed in, and if the position deviations in at least one coordinate are large enough that one of the amplifiers $OV_x$, $OV_y$ achieves the maximum output value thereof, the latter is maintained constant by means of a regulator device or arrangement illustrated in the dashed line box RK. The regulator device operates in such a manner that the Zener diodes ZD become conductive when the output value of an amplifier has been reached or exceeded the emitter potential of the transistor $P_{r1}$.

With the decreasing load current, the collector potential of the transistor $P_{r1}$ decreases. The emitter potential of the transistor $P_{r2}$ follows so that the supply voltage $U_{DA}$ for the D-A converters $DA_x$, $DA_y$ will be reduced equally and the output voltage of the amplifier which has released the limitation remains constant. The supply voltage of the D-A converters is increased in a corresponding manner when the Zener diodes block in the Zener direction. Because of the regulation of the output voltage of the amplifiers to constant values by means of the regulator device, fluctuations of the current in the D-A converters because of current varitions in the transistors serving as switches $S_{ox} \ldots S_{nx}$, $S_{oy} \ldots S_{ny}$ will no longer be noticeable with decreasing position deviations at the inputs of the power amplifiers feeding the servomotors. The movable machine part is moved by means of the analog speed feedback control system, and the maximum admissible speed remains constant. By reason of the fact that the position deviations form at each point of the path the nominal values of the speed feedback control system, the system is at all times corrected in such a manner that the nominal values constitute the objective of the path. Beginning with the value of the position deviation at which the regulating unit consisting of the transistors $P_{r1}$ and $P_{r2}$ of the regulator device is fully modulated, the output values of the operational amplifiers $OV_x$, $OV_y$ will decrease with further decreasing position deviations, according to the characteristic curve of the D-A converters $DA_x$, $DA_y$, whereupon the speed regulation passes over into a pure position regulation. The nominal position value is thereafter reached by correcting any possible path errors which may have been produced during the speed regulation. If new nominal position values are programmed before an actual position value has been reached, a summation of the respective small errors to large errors is reliably prevented.

With small values of $U_{1x}$, $U_{1y}$, i.e., with small nominal speeds in the speed feedback control systems and large position deviations which represent a small total resistance of a D-A converter, the voltage $U_{DA}$ at the D-A converters $DA_x$ and $DA_y$ becomes very small. This is expressed by the equation $$\frac{U_{DA}}{R_{DA}} = \frac{U_1}{R_o}$$

wherein $R_{DA}$ represents the total resistance of a D-A converter $DA_x$, $DA_y$, $R_o$ represents the negative feedback resistance of an operational amplifier $OV_x$, $OV_y$, and $U_1$ represents the output voltage of an operational amplifier.

If the equation is changed to $$U_{DA} = \frac{R_{DA}}{R_o} U_1$$

it is readily apparent that the product $U_{DA}$ becomes very small with small factors $R_{DA}$ and $U_1$. The supply voltage $U_{DA}$ may then drop below the residual voltages of the switching transistors in the D-A converters which connect and disconnect the D-A resistances as switches $S_{ox} \ldots S_{nx}$, $S_{oy} \ldots S_{ny}$.

In order to prevent the drop of the supply voltage $U_{DA}$ below a minimum value, the present invention provides two additional digital to analog converters $DA'_x$ and $DA'_y$ which are fed by a voltage $U'_{DA}$ and whose D-A resistances $G'_{ox} \ldots G'_{nx}$, $G'_{oy} \ldots G'_{ny}$ are actuated by means of switches $S'_{ox} \ldots S'_{nx}$, $S'_{oy} \ldots S'_{ny}$ by the bits of the digital position deviation in the same manner as the D-A resistances and switches of the D-A converters $DA_x$, $DA_y$. The output currents $J'_x$ and $J'_y$ through the additional D-A converters flow into the inputs of the operational amplifiers $OV_x$, $OV_y$.

The current in the sum points $S_x$, $S_y$ is then $$J - J' = J_o$$

wherein $J$ identifies the currents through the D-A converters, $J'$ the currents through the additional D-A converter, and $J_o$ the negative feedback current of the operational amplifiers.

This is expressed by $$\frac{U_{DA}}{R_{DA}} - \frac{U_{DA}'}{R_{DA}'} = \frac{U_1}{R_o}$$

Assuming that $R_{DA} = R'_{DA}$, the following equation applies:

$$U_{DA} - U'_{DA} = \frac{R_{DA}}{R_o} \cdot U_1$$

With great deviations (i.e., small $R_{DA}$) and low velocities ($U_1$), the regulated supply voltage $U_{DA}$ will approach the fixed voltage $U'_{DA}$ supplying the additional D-A converters below which it can not fall.

The voltage $U'_{DA}$ is suitably chosen so high that it is sufficiently high over the residual voltages of the switching transistors in the D-A converters $DA_x$ and $DA_y$.

The above-described circuit has the additional advantage that by a joint displacement of the voltages $U_{DA}$ and $U'_{DA}$ with respect to the zero potential, the direction of the output currents of the D-A converters may be reversed.

In the control as described above, the path velocity varies in dependence upon the angle of inclination of the path. Although the rates of revolutions of the servomotors are fully utilized so that the path velocities, with the exception of the motion in only one coordinate direction, are always higher than the speed which corresponds to the maximum revolution rate of a driving motor, and at least approximate independence is required for some processing problems.

This requirement is satisfied by the circuit illustrated in the dashed line box RKF. If it is provided, the series connection contained in the edging RKK from diodes $D_x$ and $D_y$ as well as Zener diodes ZD together with the supply lines become superfluous.

Currents $i_x$, $i_y$ corresponding to the outputs $U_{1x}$, $U_{1y}$ of the operational amplifiers $OV_x$, $OV_y$ flow over the series connection of a resistance $R_{sx}$ and $R_{sy}$, respectively, of a transistor $P_{sx}$ and $P_{sy}$, respectively, a resistance $R_{fx}$ and $R_{fy}$, respectively, and a transistor $P'_{sx}$ and $P'_{sy}$ to the inputs of a function generator FG whose construction and operation will be explained further hereinbelow. The purpose of the function generator is to relate the path velocity $V_B$ with the coordinate velocities $V_x$ and $V_y$ in accordance with the equation $$V_B = \sqrt{V_x^2 + V_y^2} = \text{a constant}$$

$V_x$ is thereby proportional to the output parameter $U_{1x}$, and $V_y$ is proportional to the output parameter $U_{1y}$. The series connections $R_{sx}P_{sx}$, $P_{sy}P_{sy}$ convert the output voltages of the operational amplifiers into currents $i_x$, $i_y$ whose magnitude depends upon the output voltages of the amplifiers. The voltage drops at the resistances $R_{fx}$ and $R_{fy}$ are thus proportional to the voltages $U_{1x}$ and $U_{1y}$ resistances $R_{fx}$ and $R_{fy}$. By way of the transistors $P'_{sx}$ and $P'_{sy}$, these voltage drops are also applied to the resistances $R_{fx2}$ and $R_{fy2}$. The function generator FG places at $R_{fx2}$ and $R_{fy2}$ parallel resistances so that, with increasing voltages at $R_{fx}$ and $R_{fy}$, the currents $i'_y$ and $i'_x$ are influenced in such a manner that the sum $(i'_x + i'_y)$ corresponds to the term $$\sqrt{i_x^2 + i_y^2}$$

The sum voltage at the resistance $R_s$ and produced by the currents $i'_x + i'_y$ flowing over the load circuits of the transistors $P'_{sx}$ and $P'_{sy}$ modulates the transistor $P_s$ which, in turn, modulates the transistor $P_{r1}$ of the regulating device shown in the broken line box RK. The voltages at the D-A converters $DA_x$, $DA_y$ are thus controlled in such a manner that the output voltages of the operating amplifiers $OV_x$, $OV_y$ assume values which result in a path velocity which is independent of the driving angle. It is further possible to provide the resistances $R_{fy}$ and $R_{fx}$ as D-A converters so that the voltages $U_{1x}$ and $U_{1y}$ are applied to the base of $P'_{sx}$ and $P'_{sy}$ with a different proportionality factor which may be determined by way of the D-A converters. By way of these two D-A converters, which have not been illustrated, and whose inputs are connected in parallel, it is possible to program the desired path velocity. The function generator FG consists essentially of resistances $R_1$, $R'_1$; $R_2$, $R'_2$; $R_3$, $R'_3$ which are connected with supply lines by way of diodes over which a portion of the currents $i'_x$ and $i'_y$ may be supplied if the currents $i_x$ and $i_y$ furnished by the series connections $R_{sx}P_{sx}$; $R_{sy}P_{sy}$ build up a voltage at $R_{fx}$ and $R_{fy}$ which is proportional to the output voltages $U_{1x}$ and $U_{1y}$ of the operational amplifiers. Also connected in series with one pair of resistances each are voltage sources $U_6$, $U_8$, $U_{10}$ whose voltages are different and amount, for example, to 6, 8 and 10 volts, respectively. The voltage at the resistance $R_{fx}$ and $R_{fy}$, respectively, rises with the increasing current $i_x$ and $i_y$, respectively, in a linear manner and therewith increases the voltage at the resistance $R_{fx2}$ and $R_{fy2}$ so that the currents $i'_x$ and $i'_y$ will rise until a voltage of, for example, 6 volts has been attained. If this voltage is exceeded, currents $i'_x$ and $i'_y$ are increased by additional currents over resistance $R_1$ and $R'_1$, respectively, so that $i'_x$ and $i'_y$ will increase more rapidly than $i_x$ and $i_y$, respectively. When the voltage drop at $R_{fx2}$ and $R_{fy2}$ has reached 8 volts, the current increase receives a further boost, i.e., the current $i'_x$ and $i'_y$ increases even more rapidly until 10 volts have been reached. The voltage at $R_s$ due to $i'_x + i'_y$ follows the function $$i'_x + i'_y = \sqrt{i'_x{}^2 + i_y{}^2} = \text{a constant}$$

more precisely the more pairs of resistances are present. In actual practice, however, several pairs of resistances will suffice. In the place of voltage sources having different voltage values, Zener diodes having different Zener voltages may, of course, be employed. The absolute value of the velocities at which the movable machine part is moved may be varied in a simple manner by way of the magnitude of the voltages feeding the D-A converters $DA_x$, $DA_y$.

With low velocities and large, still admissible position deviations, the supply voltages of the D-A converters become so small under some operating conditions that the then relatively large residual voltages of the transistors acting as switches may cause considerable errors.

For the purpose of eliminating this drawback, it is proposed in accordance with a further embodiment of the present invention, to connect to the outputs of $OV_x$ and $OV_y$ two additional D-A converters (not shown), which are supplied by the relatively high output voltages $U_{1x}$, $U_{1y}$ of the operating amplifiers $OV_x$, $OV_y$ and whose output values form the nominal values of the speed feedback control systems. The two additional D-A converters are then controlled by the same digital parameter signifying the desired velocity which is mounted, for example, on a program carrier or which may be manually inserted into the control by way of decade switches.

Figure 3:
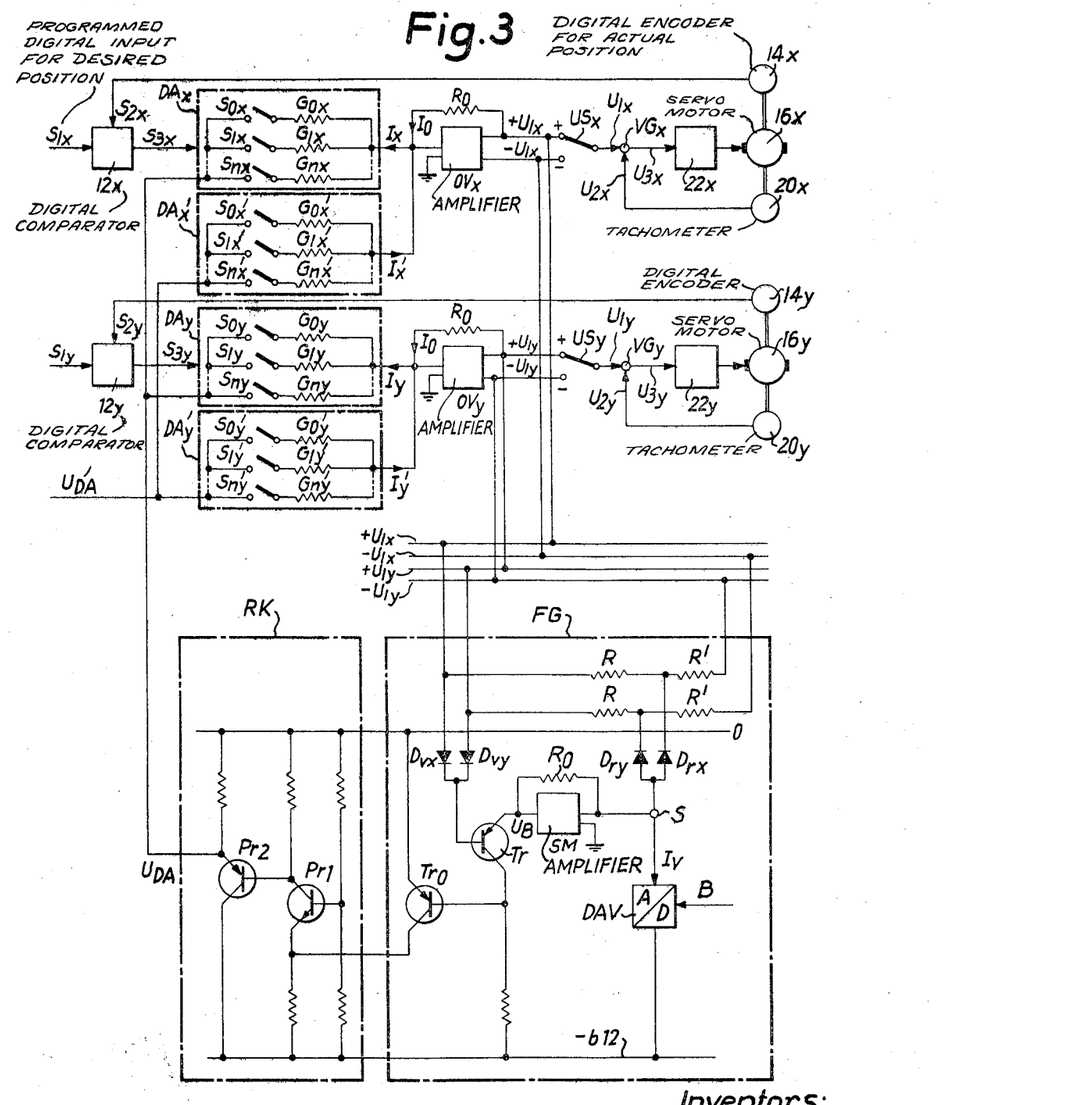
FIGURE 3 is a schematic circuit diagram of a second embodiment of the invention.

FIGURE 3 illustrates another embodiment of the invention which requires only one additional D-A converter for programming the path velocity by means of a digital signal taken, for example, from the punched tape. The switching elements which are of interest in this case are positioned within the dashed line box FG. A parameter corresponding to the desired path velocity $V_B$ is fed in by way of a D-A converter DAV which, in conformity with the D-A converters $DA_x$ and $DA_y$, may consist of connectable and disconnectable parallel resistances, for example by means of a digital command B taken from a punched tape and controlling the resistances of DAV. For reasons which will be set forth hereinbelow, the parameter $J_v$ generated by the D-A converter DAV and corresponding to the nominal velocity value $V_B$ is valued as $1/\sqrt{2}$ times the amount $|V_B|$ of the vector of this nominal velocity value $V_B$. The function generator contained within the dashed line box FG adds to the programmed parameter $J_v$, which is proportional to the desired path velocity $V_B$ which modulates the feedback control system RK, and which is intended to remain constant for a path angle $\alpha = 45°$, values independent of the path angle so that the output signal $U_B$ which modulates the feedback control system maintains the path velocity constant.

The function generator proper consists of the resistances R and R', the diodes $D_{rx}$, $D_{ry}$, and the summation point S which is constituted by the input of a negative feedback summation amplifier SM whose output signal $U_B$ is intended to change with the path angle.

The gate consisting of the diodes $D_{rx}$, $D_{ry}$ assures that a current corresponding to the greatest value of the positive and negative difference of $U_{1x}$ and $U_{1y}$ will be applied to the input S of the summation amplifier SM. Depending upon the sign of the difference between $U_{1x}$ and $U_{1y}$, this current is proportional to the value $$|V_B| \sin \alpha - |V_B| \cos \alpha$$

and, respectively, to the negative value since $U_{1x}$ may be assumed to be $= |V_B| \sin \alpha$ and $U_{1y}$ may be assumed to be $= |V_B| \cos \alpha$, wherein $|V_B|$ is the magnitude of the vector of the path velocity, i.e., $J_v \cdot \sqrt{2}$. The resistances R and R' are so chosen with respect to the negative feedback resistance $R_0$ of the summation amplifier that that current corresponding to the difference $\pm |V_B|$ (sin $\alpha$ — cos $\alpha$) is multiplied by the value $$1 - \frac{1}{\sqrt{2}}$$

The output signal $U_B$ of the summation amplifier SM acting as computing amplifier is in this case determined by the signal $J_v$ generated by the D-A converter DAV and corresponding to the value $$\frac{1}{\sqrt{2}} \cdot |V_B|$$

and by an added signal which corresponds to the difference $\pm |V_B|$ (sin $\alpha$ — cos $\alpha$) multiplied by $$1 - \frac{1}{\sqrt{2}}$$

which depends upon the path angle $\alpha$.

Figure 5:
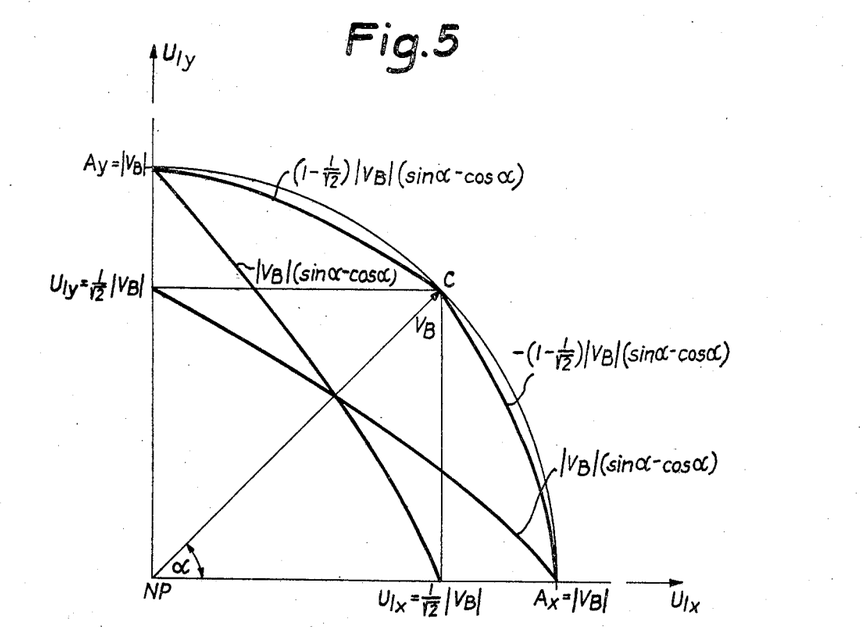
FIGURE 5 is a graph illustrating the operation of the embodiment disclosed in FIGURE 3.

FIGURE 5 illustrates again graphically the conditions which have been described hereinbefore. At a path angle of 45° (line from NP to C), the output parameters $$U_{1x} = \frac{1}{\sqrt{2}} |V_B| \text{ and } U_{1y} = \frac{1}{\sqrt{2}} |V_B|$$

are equal since the driving motors $16_x$ and $16_y$ in the coordinates X and Y must have identical rates of revolutions. The control parameter $J_v$ generated by DAV will then remain unchanged and will correspond to the output signal $U_B$ thereof.

In order to maintain the path velocity exactly constant at path angles between 45° and 90° and between 45° and 0°, which path velocity corresponds to the programmed parameter $J_v$, the control parameter $J_v$ had to be so varied that the vector $V_B$ travels on the circular arcs $CA_y$ and $CA_x$, respectively, with a varying angle $\alpha$. The function generator adds to the control parameter $J_v$ a further parameter which is variable with $\alpha$ so that the vector $V_B$ travels on the curve $$\frac{1}{\sqrt{2}} |V_B| + \left(1 - \frac{1}{\sqrt{2}}\right) |V_B|(\sin \alpha - \cos \alpha)$$

from C to $A_y$ and, respectively, the curve $$\frac{1}{\sqrt{2}} |V_B| - \left(1 - \frac{1}{\sqrt{2}}\right) |V_B|(\sin \alpha - \cos \alpha)$$

from C to $A_x$. These curves are sufficiently close to the ideal circular shape.

The amount of the output value $U_B$ of the summation amplifier is compared with the respectively larger one of the values $U_{1x}$, $U_{1y}$ which is applied by way of the gate consisting of the diodes $D_{vx}$, $D_{vy}$.

A transistor $Tr$ is modulated in dependence upon the difference and modulates a further transistor $T_{ro}$ whose output signal forms the nominal value of the feedback control system in the dashed line box RK.

The circuit illustrated in the dashed line box FG of FIGURE 3 thus assures, by means of the output signal $U_B$ thereof, that the revolution rates of the motors corresponding to the different coordinates will simultaneously so vary in dependence upon the path angle that the path velocity proportional to the value $J_v$ remains approximately constant.

Generally, the nominal position values are fed into the control in binary coded decimal form. If the actual position values are also fed in binary coded decimal form, the position deviation will appear in BCD form if a BCD comparator unit is provided. The D-A converters for the individual coordinates must then be graduated in decade form. In a large position regulation range of, for example, 4–5 decades, the resistances of the highest decade to be provided as precision resistances have very low ohmic values, which will lead to errors when switching transistors are used. Alternately, if correspondingly higher ohmic values of the decade resistances are employed, these decades must be connected with voltages which are several times higher than those voltages which are required for the low decades. Regulation of such high D.C. voltages by way of one of the voltage feedback control systems is expensive and may be a source of disturbances if the high voltages are transferred into other parts of the control.

Figure 4:
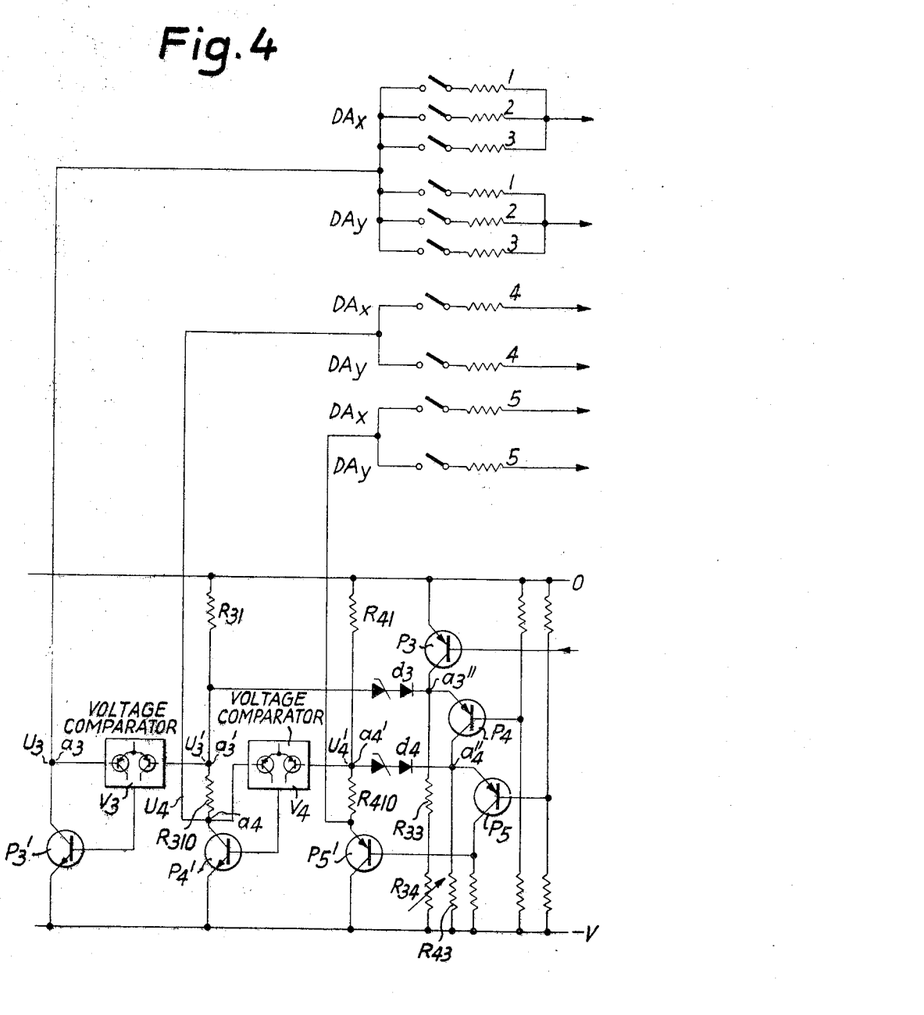
FIGURE 4 is a schematic circuit diagram of a circuit for controlling the input voltage to the digital to analog converters disclosed in FIGURES 2 and 3.

The circuit shown in FIGURE 4 eliminates these difficulties with a very low additional expenditure. Reference symbols $DA_x$ and $DA_y$ designate the D-A converters in the X and, respectively, the Y coordinate. The resistance symbols 1 . . . 5 do not represent, in this case, individual D-A resistances, as was the case in the preceding figures, but rather all of the D-A resistances of one decade. The D-A converters illustrated, which modulate operating amplifiers $OV_x$, $OV_y$ (not shown in this figure), thus have five decades. Reference symbols $V_3$ and $V_4$ identify comparative members which may consist, for example, of difference amplifier stages known per se and which compare and approximate the voltages $U_3$ and $U_4$ at points $a_3$ and $a_4$ by way of transistors $P'_3$ and $P'_4$ to the voltages $U'_3$ and $U'_4$ at the points $a'_3$ and $a'_4$. The differences between the voltages being compared with each other modulate in each case one of two emitter-coupled transistors of a comparative member which controls the transistors $P'_3$ and $P'_4$, respectively, connected to the output side in such a manner as to open or close it for the purpose of eliminating the voltage difference. The resistances $R_{31}$, $R_{31o}$ and $R_{41}$, $R_{41o}$ are selected in a ratio of 1:10. In contrast to the description of the preceding figures, the description of FIGURE 4 will not be based upon the premise of a maximum position deviation generated by the arithmetic unit and reduced by the position regulation proposed by the present invention. Instead, for the sake of a clearer showing, and in contrast to the actual course of the regulation, it will be assumed that the position deviations, starting from a nominal value, increase up to a maximum limit determined by the predetermined decade number of the D-A converters. The regulation device is assumed to be so designed that the two first decades 1 and 2 of the D-A converters are supplied with a constant maximum voltage $U_3$. It is assumed further that only when charging the third decade, is the deviation so large that the supply voltage of the D-A converters is decreased in order to maintain the output voltage of at least one operating amplifier constant. This is accomplished, for example, by way of a transistor $P_3$ which corresponds to the transistor $P_s$ of FIGURE 2. Transistor $P_3$ is modulated into the conductive condition and thereby pulls the potential of point $a'_3$, which was previously positioned by way of $R_{33}$ and $R_{34}$ almost at the potential of the negative supply voltage V, toward zero. By way of transistor $P'_3$, the comparative member $V_3$ decreases the supply voltage $U_3$ of the first three decades 1, 2, and 3 of the D-A converters $DA_x$, $DA_y$ in correspondence with the voltage $U'_3$ at point $a'_3$, which is reduced by the modulation of the transistor $P_3$. When the third decade is fully modulated (i.e., at the maximum output current thereof), the supply voltage of the D-A converters has decreased to approximately one tenth of the maximum supply voltage if, beginning with the modulation of the fourth decade 4 of the D-A converters, at an increasing deviation and further modulation of the transistor $P_3$, the voltage at point $a'_3$, and therewith the supply voltage $U_3$, are held at a value predetermined by the ratio of the resistances $R_{31o}$ and $R_{31}$. At this voltage, the transistor $P_4$ will become conductive and will reduce the voltage at $a'_4$ with a further increasing position deviation and, by way of the comparative member $V_4$ and the transistor $P'_4$, will also reduce the supply voltage $U_4$ of the fourth decade of the D-A converters. When a specific maximum value has been attained, the voltage at point $a_4$, and therewith the supply voltage $U_4$ of the fourth decade, is again maintained at a specific value which is set or determined by the ratio of the resistances $R_{41o}$ and $R_{41}$. Upon a further increase of the position deviation, the transistor $P_5$ becomes conductive and controls the associated transistor $P'_5$ in the sense of decreasing supply voltages $U_5$ for the fifth decade of the D-A converters.

The initial value of the supply voltage $U_3$ and therewith the inclination of the characteristic within the operating range are adjusted by way of the resistance $R_{34}$.

It should be emphasized once again that during the operation of the numerical control, large position deviations are in reality programmed at the beginning of a new path, and the deviations are then continuously reduced.

The circuit of FIGURE 4 has the significant advantage that the supply voltage of the highest decade is regulated up to a maximum value with the decreasing position deviation and is held constant at this value. Thereupon the supply voltage of the second highest decade is regulated up to the same maximum value, until the next decade is regulated. With the aid of the above-described circuit, it is possible to use in actual operation the highest decades of the momentary position deviation within a voltage range which is favorable for D-A converters. The number of the D-A converters may accordingly be as large as desired so that very large increments are still processed meaningfully.

The circuit operates purely in a binary manner when a genuine binary code is used. Instead of the decade voltage and resistance graduation, a binary graduation must be introduced in this case.

The control as proposed by the present invention is not limited, of course, to two-dimensional controls. Instead, the same may be extended without difficulty to a three-dimensional operation.

It will be understood that the above description of the present invention is susceptible to various modifications, changes, and adaptations.

We claim:
1. In a hybrid machine control system for simultaneously moving two movable machine elements in accordance with a predetermined digital program, said hybrid machine control system including:
(A) digital input means for generating programmed digital input signals indicating a desired movement of said two movable machine elements;
(B) a first and a second digital encoder each coupled to a corresponding one of said movable machine elements for producing digital feedback signals indicating the actual movement of the corresponding machine element;
(C) digital comparator means coupled to said input means and to said first and second encoders for comparing said digital feedback signals with said digital input signals and for producing first and second digital deviation signals indicating the deviation of the corresponding movable machine element from its desired movement;
(D) a first and a second digital to analog converter each coupled to said digital comparator means for converting the corresponding digital deviation signal into an analog deviation signal; and
(E) a first and a second analog servo system each coupled between a corresponding one of said digital to analog converters and a corresponding one of said movable machine elements for moving said movable machine element in accordance with the corresponding analog deviation signal; the improvement comprising (F) regulator means coupled between the input and output of both digital to analog converters, said regulator means being operable to vary the same input circuit parameter of both digital to analog converters whenever the output signal of either digital to analog converter exceeds a predetermined threshold value.

2. A machine control system as defined in claim 1 wherein said digital to analog converters each comprise a plurality of input resistors coupled together in parallel between a source of voltage and a current junction, a corresponding switch coupled in series with each of said resistors and operable when closed to connect the corresponding resistor to said current junction, each of said switches being responsive to a corresponding digit of the corresponding digital deviation signal, the value of each resistor being proportional to a corresponding digit of a corresponding digital deviation signal, an amplifier coupled to said current junction, and wherein said regulator means is coupled to the output of said amplifiers and to the voltage sources for said input resistors, said regulator means being operable to vary the voltage applied to all of said input resistors whenever the output signal of either of said amplifiers exceeds a predetermined threshold value.

3. A hybrid machine control system as defined in claim 2 wherein said amplifiers each comprise an operational amplifier having negative feedback and a relatively high value of input impedance.

4. A hybrid machine control system as defined in claim 2 wherein said regulator means is coupled to the output of said amplifiers by means of a common threshold circuit and an OR-gate, the output of said OR-gate being coupled to said common threshold circuit, and the inputs of said OR-gate being coupled to the outputs of said amplifiers.

5. A hybrid machine control system as defined in claim 4 wherein said threshold circuit includes at least one Zener diode whose Zener voltage serves as the threshold value for said regulator means and defines said predetermined output threshold value for said amplifiers.

6. A hybrid machine control system as defined in claim 2 and further comprising means for varying the voltage applied to said input resistors as a function of the analog deviation voltage in graduated steps ranging from $\frac{1}{10}$ of a maximum value to the maximum value.

7. A hybrid machine control system as defined in claim 1 and further comprising (G) function generator means coupled between the input and output of both digital to analog converters, said function generator means being operable to vary the same input circuit parameter of both digital to analog converters for maintaining a predetermined constant mathematical relationship between the output signals thereof.

8. A hybrid machine control system as defined in claim 7 wherein said function generator means comprises a network of parallel connected groups of resistors coupled in series with a threshold member, each resistance of one group of resistances being connected via a diode to a voltage proportional to the output signal of a corresponding digital to analog converter.

9. A hybrid machine control system as defined in claim 7 wherein the output signals of said digital to analog converters are applied to input resistors of said function generator means, said input resistors being controllable by means of a digital signal for controlling the mathematical relationship defined by said function generator means.

10. A hybrid machine control system as defined in claim 7 wherein said function generator means comprises a computing circuit whose output signal is taken from a summation point to which is applied a parameter corresponding to the desired value of $V_B$ and a parameter corresponding to the highest value of the positive and negative difference of the digital to analog converter output signals multiplied by $$\left(1-\frac{1}{\sqrt{2}}\right)$$

11. A hybrid machine control system as defined in claim 10 wherein the highest value of the differences from positive and negative output signals of the digital to analog converters is multiplied by the value $$1-\frac{1}{\sqrt{2}}$$

in a computer circuit comprising two resistors coupled in operative relationship with a negative feedback resistor of a summation amplifier.

12. A hybrid machine control system as defined in claim 10 wherein said parameter corresponding to the desired value of $V_B$ is generated by a digital to analog converter comprising a plurality of resistances which are controlled by the corresponding digit values of a binary signal.

13. A hybrid machine control system as defined in claim 12 wherein the output signal of one digital to analog converter and the output signal having opposite polarity of the other digital to analog converter are connected to a summing junction via a corresponding resistor and diode.

14. A hybrid machine control system as defined in claim 13 wherein said summing junction is coupled to a summation amplifier having inverse feedback.

15. A hybrid machine control system as defined in claim 13 and also comprising a second group of parallel input resistors coupled to the input of each of said two current junctions a second group of switches controlling the operation of the corresponding input resistors, and a common low voltage source coupled to said second group of parallel input resistors.

16. A hybrid machine control system as defined in claim 15 wherein the resistance values of said second group of parallel input resistors is proportional to the resistance values of said first group of parallel input resistors.

17. A hybrid machine control system as defined in claim 7 and also including a third digital to analog converter coupled between the output of said two digital to analog converters and the input of said function generator means, said third digital to analog converter being operable to receive digital signals signifying a desired mathematical relationship and to modulate said function generator means in accordance with said desired mathematical relationship.

References Cited
UNITED STATES PATENTS

| | | |
|---|---|---|
| 3,169,424 | 2/1965 | Branscom et al. 235—151.11 X |
| 3,172,026 | 3/1965 | Schuman 235—151.11 X |
| 3,227,864 | 1/1966 | Kadoguchi 235—151.11 |
| 3,310,663 | 3/1967 | Bouman 235—151.1 |
| 3,303,332 | 2/1967 | Gotz 235—151.11 |
| 3,351,746 | 1/1967 | Gotz et al. 235—151.11 |

MALCOLM A. MORRISON, Primary Examiner

JOSEPH F. RUGGIERO, Assistant Examiner

U.S. Cl. X.R.

235—151.11